(12) United States Patent
Okuyama (10) Patent No.: US 6,327,092 B1
(45) Date of Patent: Dec. 4, 2001

(54) CROSS DICHROIC PRISM

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,178

(22) Filed: Dec. 2, 1999

(30) Foreign Application Priority Data

Dec. 4, 1998 (JP) ................................................ 10-361963

(51) Int. Cl.$^7$ ............................ G02B 27/14; G03B 21/28
(52) U.S. Cl. ...................... 359/634; 359/629; 359/833; 353/81
(58) Field of Search .................................. 359/629, 634, 359/637, 638, 639, 640, 649, 833, 834, 835, 836, 837; 353/30, 33, 81; 349/5, 7, 8, 9

(56) References Cited

U.S. PATENT DOCUMENTS

| 4,249,205 | 2/1981 | Buchroeder | 348/780 |
|---|---|---|---|
| 5,546,200 | 8/1996 | Nicolas et al. | 359/15 |
| 5,689,736 | 11/1997 | Okuyama et al. | 396/51 |
| 5,815,741 | 9/1998 | Okuyama et al. | 396/51 |
| 6,019,474 | 2/2000 | Doany et al. | 353/33 |
| 6,097,544 | * 8/2000 | Edlinger et al. | 359/634 |
| 6,141,150 | * 10/2000 | Ushiyama et al. | 359/618 |

FOREIGN PATENT DOCUMENTS

| 0 945 749 | 9/1999 | (EP) . |
|---|---|---|
| 475415 | 4/1937 | (GB) . |
| 2-220040 | 9/1990 | (JP) . |

* cited by examiner

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

In a cross dichroic prism wherein four square pillar prisms of which the total of the angles including the prism ridge lines is 360° are joined together with the prism ridge lines thereof made coincident with one another and prism sides forming the respective prism ridge lines are joined together so that the joined surface thereof may become two planes intersecting with each other, and dichroic film is provided on the joined surface, when the lengths of perpendiculars from a point on the prism ridge line to the non-joined surfaces of the respective square pillar prisms are defined as L1, L2, L3 and L4, $$L1 \neq L2 = L3 = L4$$

is satisfied.

16 Claims, 6 Drawing Sheets

CROSS DICHROIC PRISM

BACKGROUND OF THE INVENTION

1. Field of the Invention

This invention relates to a cross dichroic prism and an optical system having the same, and is suitable, for example, as color separating means and/or color combining means for use in a color liquid crystal projector, a three-plate CCD camera or the like.

2. Related Background Art

Figure 13:
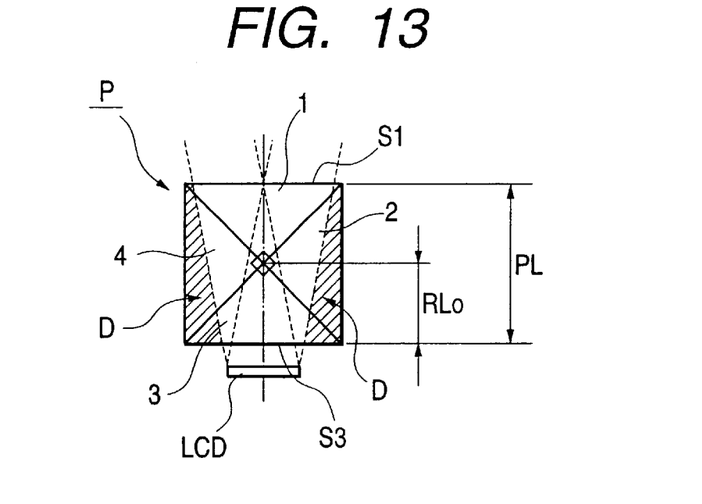
FIG. 13 is a schematic view of the essential portions of a cross dichroic prism according to the prior art.
Figure 14:
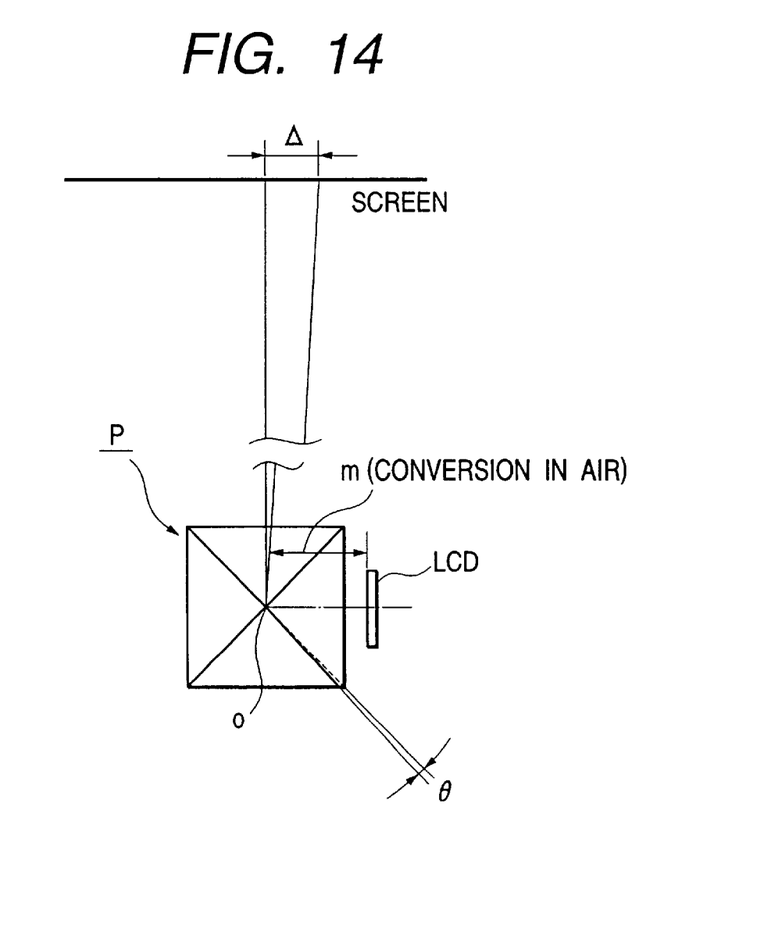
FIG. 14 is a typical view of a projection apparatus using the cross dichroic prism according to the prior art.

A cross dichroic prism P as shown in FIGS. 13 and 14 of the accompanying drawings has heretofore been used as the color separating means or color combining means of a color liquid crystal projector.

The cross dichroic prism P, as shown in FIG. 13, comprises four rectangular prisms 1, 2, 3 and 4 of triangle poles cemented together so that the apex angles of those prisms may intersect with one another. A dichroic surface (film) is provided on the joined surface of each prism. The dichroic surface intersects with other surface at 90°.

The cross dichroic prism according to the prior art comprises four rectangular prisms cemented together as previously described and therefore suffers from the problem that it is bulky and heavy. Particularly in a liquid crystal projector using a liquid crystal panel provided with a microlens for condensing light for each pixel, a light beam emerging from the liquid crystal panel is great in angle of divergence due to the action of the microlens, and it has been necessary to make the cross dichroic prism provided between the liquid crystal panel and a projection lens considerably large.

SUMMARY OF THE INVENTION

The present invention has as its object the provision of a compact cross dichroic prism and an optical system using the same.

The cross dichroic prism according to a first aspect of the invention is a cross dichroic prism in which four square pillar prisms, of which the total of the angles including the prism ridge lines is 360°, are joined together with the prism ridge lines thereof made coincident with one another, and prism sides forming the respective prism ridge lines are joined together so that the joined surface thereof may become two planes intersecting with each other. Dichroic film is provided on the joined surface. When the lengths of perpendiculars from a point on the prism ridge line to the non-joined surfaces of the respective square pillar prisms are defined as L1, L2, L3 and L4, $$L1 \neq L2 = L3 = L4$$

is satisfied.

The term "square pillar" is not limited to a square shape but includes the meaning of "prismatic shape".

A second aspect of the invention is characterized in that in the first aspect of the invention a set of square pillar prisms of two opposedly disposed square pillar prisms of the four square pillar prisms are equal in the area of the non-joined surface thereof to each other and the other set of square pillar prisms differ in the area of the non-joined surface thereof from each other.

A third aspect of the invention is characterized in that, in the first or second aspects of the invention, two of the four square pillar prisms are isosceles square pillar prisms of which the two sides are equal and the other two are square pillar prisms of which the sides differ in length from one another.

The optical. system according to a fourth aspect of the invention is characterized by the cross dichroic prism of any one of the first to third aspects of the invention.

The projection apparatus according to a fifth aspect of the invention is characterized in that, by the utilization of the cross dichroic prism of any one of the first to third aspects of the invention, a plurality of image lights differing in color from one another are projected by a projection optical system.

The cross dichroic prism according to a sixth aspect of the invention is characterized in that one of a set of opposed light transmitting surfaces is made smaller than the other.

The cross dichroic prism according to a seventh aspect of the invention is characterized by providing another set of light transmitting surfaces which are opposed to each other and have the same light transimitting area.

The cross prism of an eighth aspect of the invention is characterized in that one of a set of opposed light transmitting surfaces is made smaller than the other.

A ninth aspect of the invention is characterized in that in the eighth aspect of the invention there is provided another set of light transmitting surfaces which have the same size and are opposed to each other.

A tenth aspect of the invention is characterized in that in the eighth aspect of the invention half-transmitting films crossing each other are supplied to the interior of the prism.

An eleventh aspect of the invention is characterized in that in the eighth aspect of the invention dichroic films crossing each other are supplied to the interior of the prism.

The optical system of a twelfth aspect of the invention is a light combining optical system having the cross dichroic prism of the sixth aspect of the invention, characterized in that three divergent lights to be combined are caused to enter the prism from the one small light passing surface and light passing surfaces on the opposite sides of the light passing surface.

The optical system of a thirteenth aspect of the invention is a light combining optical system having the cross prism of any one of the ninth to eleventh aspects of the invention, characterized in that three divergent lights to be combined are caused to enter the prism from the one small light passing surface and light passing surfaces on the opposite sides of the light passing surface.

The optical system of a fourteenth aspect of the invention is a light separating optical system having the cross dichroic prism of the sixth aspect of the invention, characterized in that a convergent light to be separated is caused to enter the prism from the other large light passing surface.

The optical system of a fifteenth aspect of the invention is a light separating optical system having the cross prism of any one of the ninth to eleventh aspects of the invention, characterized in that a convergent light to be separated is caused to enter the prism from the other large light passing surface.

A sixteenth aspect of the invention is a projection apparatus characterized by utilization of a prism according to any one of the sixth to eleventh aspects of the invention, a plurality of image lights differing in color from one another are projected by a projection optical system.

DESCRIPTION OF THE PREFERRED EMBODIMENTS

Figure 1:
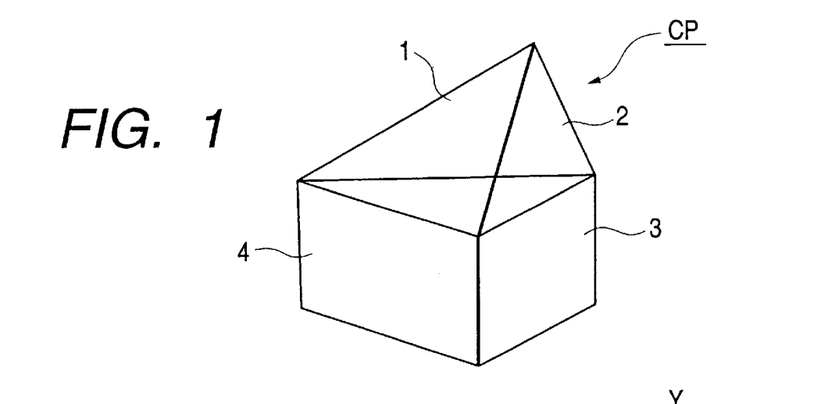
FIG. 1 is a perspective view of the essential portions of Embodiment 1 of the cross dichroic prism of the present invention.
Figure 2:
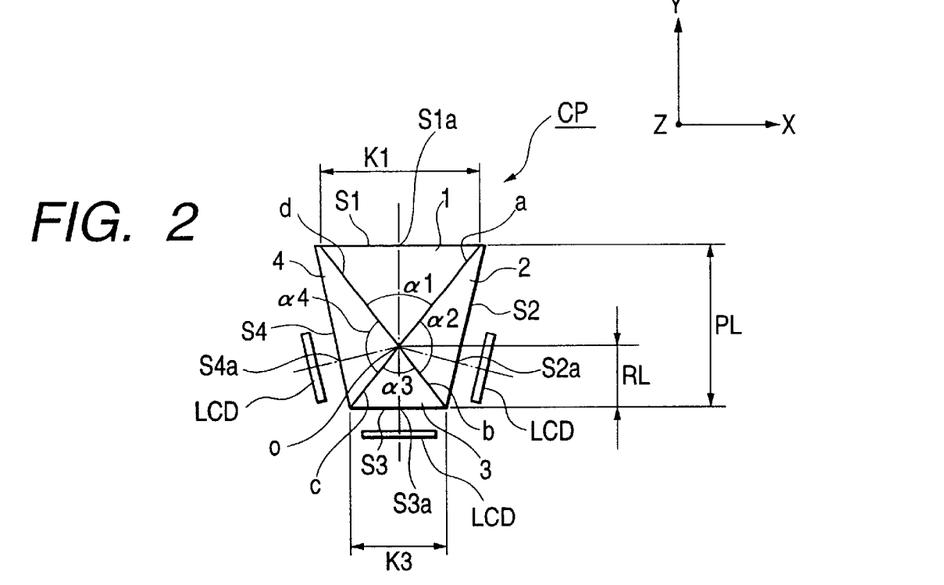
FIG. 2 is a cross-sectional view of the essential portions of Embodiment 1 of the cross dichroic prism of the present invention.
Figure 3:
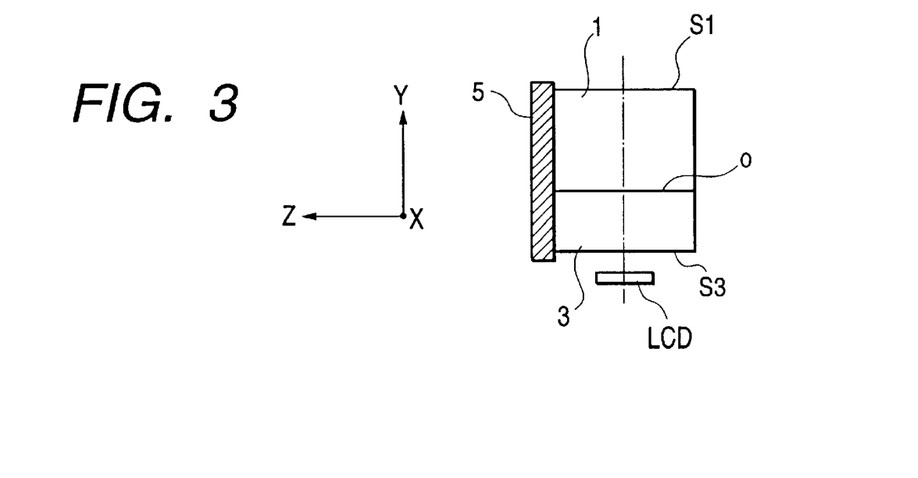
FIG. 3 is a cross-sectional view of the essential portions of Embodiment 1 of the cross dichroic prism of the present invention.

FIG. 1 is a perspective view of the essential portions of Embodiment 1 of the cross dichroic prism (cross prism) CP of the present invention, and FIGS. 2 and 3 are cross-sectional views of the essential portions of Embodiment 1.

The present embodiment is shown as one for color combination, but the basic construction is the same also when it is used as one for color separation.

In the figures, the reference numeral 1 designates a first prism, the reference numeral 2 denotes a second prism, the reference numeral 3 designates a third prism, and the reference numeral 4 denotes a fourth prism, and each of these prisms is of a square pillar-like shape. The reference numeral 5 designates a holding stand for holding the cross prism CP. LCD denotes a liquid crystal panel.

A first dichroic surface (film) ac reflecting blue light (B light) and transmitting green light (G light) and red light (R light) therethrough is formed on the joined surface a of the first prism 1 and the second prism 2 and the joined surface c of the third prism 3 and the fourth prism 4, and a second dichroic surface (film) bd reflecting red light and transmitting green light and blue light therethrough is formed on the joined surface b of the second prism 2 and the third prism 3 and the joined surface d of the fourth prism 4 and the first prism 1.

The joined surface a and the joined surface c exist on a plane, and the joined surface b and the joined surface d exist on a plane, and these intersect with each other.

The red light from LCD, the green light from LCD and the blue light from LCD enter the cross prism CP from the light incidence surface (non-joined surface) S2 of the second prism 2, the light incidence surface (non-joined surface) S3 of the third prism and the light incidence surface (non-joined surface) S4 of the fourth prism, respectively, and a color light comprising R light, G light and B light combined together emerges from the light emergence surface (non-joined surface) S1 of the first prism 1.

Here, when a portion in which the four prisms are proximate to one another is defined as a ridge line portion (prism ridge line) 0, FIG. 2 is a view of a cross-section (xy cross-section) orthogonal to the ridge line portion 0, and FIG. 3 is a view of a cross-section (YZ cross-section) orthogonal to the light emergence surface S1 of the first prism 1.

In the present embodiment, each of the first prism 1 and the third prism 3 is an isosceles triangular pillar prism in which the lengths of two sides are equal to each other, and both of them are similar figures, differing in size from each other.

The second prism 2 and the fourth prism 4 are triangular pillar prisms, and both of them are of the same shape.

When the lengths of perpendiculars from a point on the prism ridge line 0 to the non-joined surfaces S1–S4 are defined as O, S1$a$, O, S2$a$, O, S3$a$ and O, S4$a$, respectively, $$O, S1a>O, S2a=O, S3a=O, S4a.$$

The angles $\alpha 1$, $\alpha 2$, $\alpha 3$ and $\alpha 4$ formed against the prism ridge lines of the four prisms 1, 2, 3 and 4 are as follows:

$$\alpha 1=\alpha 3<90°$$

$$\alpha 2=\alpha 4<90°$$

$$\alpha 1+\alpha 2=\alpha 3+\alpha 4=180°$$

$$(\alpha 1+\alpha 2+\alpha 3+\alpha 4=360°)$$

The non-joined surface S1 and the non-joined surface S3 are parallel with each other, and the non-joined surfaces S2 and S4 are not parallel with each other. The area S1$b$ of the non-joined surface S1 and the area S3$b$ of the non-joined surface S3 differ from each other.

The area S2$b$ of the non-joined surface S2 is equal to the area S4$b$ of the non-joined surface S4.

In the present embodiment, S3$b$<S1$b$.

In the present embodiment, the width k1 of the light emergence surface of the first prism 1 on a cross-section orthogonal to the ridge line portion 0 is made greater than the width k3 of the light incidence surface S3 of the third prism 3 (K1>k3), whereby the distance (length) RL from the light incidence surface S3 of the third prism 3 to the ridge line portion 0 is $$RL=k3/(k1+k3)*PL.$$

PL is the distance (length) from the light incidence surface S3 of the third prism 3 to the light emergence surface S1 of the first prism 1. In the prior-art construction shown in FIG.

13, the distance RLo from the light incidence surface S3 of the third prism 3 to the ridge line portion 0 is RLo=PL/2 and therefore, the difference therebetween is

PL−RLo=PL/2*((k3−k1)/(k1+k3))

k1>k3, hence

RL−RLo<0

RL<RLo.

and thus, the ridge line portion 0 becomes proximate to the light incidence surface S3 of the third prism 3.

At this time, the apex angle α1 containing the ridge line portion 0 of the first prism 1 and the apex angle α3 of the third prism 3 become acute angles smaller than 90°, and the apex angle α2 containing the ridge line portion 0 of the second prism 2 and the apex angle α4 of the fourth prism 4 become obtuse angles greater than 90°.

The light incidence surface S2 of the second prism 2 is provided in symmetrical relationship with the light incidence surface S3 of the third prism 3 with respect to a second dichroic surface b, d and the light incidence surface S4 of the fourth prism 4 is provided in symmetrical relationship with the light incidence surface S3 of the third prism 3 with respect to a first dichroic surface a, c, whereby the optical path lengths of the optical paths of the respective color lights on the optical axis from the light incidence surface to the ridge line portion 0 can be made equal to one another.

Figure 4:
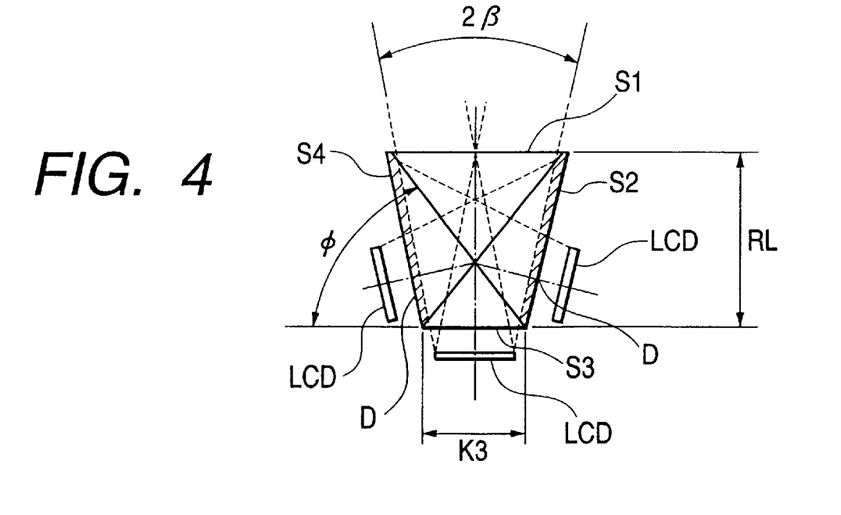
FIG. 4 is a cross-sectional view of the essential portions of Embodiment 1 of the cross dichroic prism of the present invention.

At this time, the angles formed by the light incidence surfaces S2 and S4 of the second prism 2 and the fourth prism 4 and the light emergence surface S1 of the first prism 1 can be set to angles smaller than 90° and therefore, the shape of the cross-section orthogonal to the ridge line portion 0 becomes a trapezoidal shape, and by a shape in which for the divergent light beam travelling from the light incidence surface S3 of the third prism 3 to the light emergence surface S1 of the first prism 1, an area D not used is made small as shown in FIG. 4, three light beams can be combined together and the volume of the cross prism CP can be curtailed.

When the angle of expanse of the outermost ray of the light transmitted through the cross prism CP is defined as 2β (>0) and the angle formed by the first and second dichroic surfaces and the light incidence surface S3 of the third prism 3 is defined as φ,

φ=45+β/2, whereby the light incidence surfaces S2 and S4 of the second prism 2 and the fourth prism 4 and the outermost ray of the light transmitted through the prism can be made parallel to one another, and a more compact shape is provided.

Further, when the length of the prism from the light incidence surface S3 of the third prism 3 to the light emergence surface S1 of the first prism 1 is defined as RL and the width of the light incidence surface S3 of the third prism 3 is defined as k3, if RL is determined so as to satisfy RL=k3/(tan (45−β/2)−tan (β)), the cross prism can be constructed so that the cross-sectional shapes on the cross-sections orthogonal to the ridge lines 0 of the first to fourth prisms 1–4 may be triangular and the vertexes of the respective prisms may coincide with one another, and a more compact shape can be provided.

The cross dichroic prism CP of the present embodiment comprises four prisms 1, 2, 3 and 4 joined together, and dichroic surfaces are provided on the joined surfaces of the four prisms.

When the area of the light incidence surface S3 of the third prism 3 on the optical path of light transmitted through the first dichroic surface a,c and the second dichroic surface b,d is defined as S3b and the area of the light emergence surface S1 of the first prism 1 is defined as S1b, S3b<S1b is satisfied, and when the distance from the light incidence surface S3 to the position 0 at which the dichroic surfaces intersect with each other is defined as L3 and the distance from the light emergence surface S1 to the position 0 at which the first and second dichroic surfaces (films) intersect with each other is defined as L1,

L3<L1 is satisfied, whereby the position 0 at which the first and second dichroic surfaces intersect with each other can be made proximate to the position of each liquid crystal panel LCD.

The two prism surfaces constituting a dichroic surface must be flat (the angle formed thereby must be 0). When these are inclined, there will be provided the left and right positional deviation of the image on a screen, as shown in FIG. 14.

This amount of deviation Δ, when the distance converted into air from the position at which the dichroic surfaces intersect with each other to each liquid crystal panel LCD is defined as m and the amount of angular deviation is defined as θ, becomes Δ=B·m·tanθ.

Here, B is the projection magnification of the projection lens. To make the amount of deviation small at this time, the distance m can be made small, and the position 0 at which the first and second dichroic surfaces intersect with each other is made proximate to the position of the liquid crystal panel LCD, whereby m can be made small.

Furthers, the light transmitted through the liquid crystal panel LCD emerges as a divergent light beam from the liquid crystal panel to the projection lens and therefore, the effective range S1a of the light emergence surface S1 is large relative to the effective range S3a of the light incidence surface S3 and heretofore, there has been a useless space (a portion D in FIG. 13) on the light incidence surface S3 side, but here the size of the light incidence surface S3 is made smaller than the size of the light emergence surface S1 and is made approximate to the effective range to thereby decrease this useless space.

When such a cross dichroic prism is applied to a color liquid crystal projection using three liquid crystal panels, if it is used in combination with a so-called liquid crystal panel with a microlens array provided with a minute lens (microlens) corresponding to each pixel of the liquid crystal panels on the light incidence side, it will be more effective, but even when use is made of liquid crystal panels having no microlens array, it is still effective.

Figure 5:
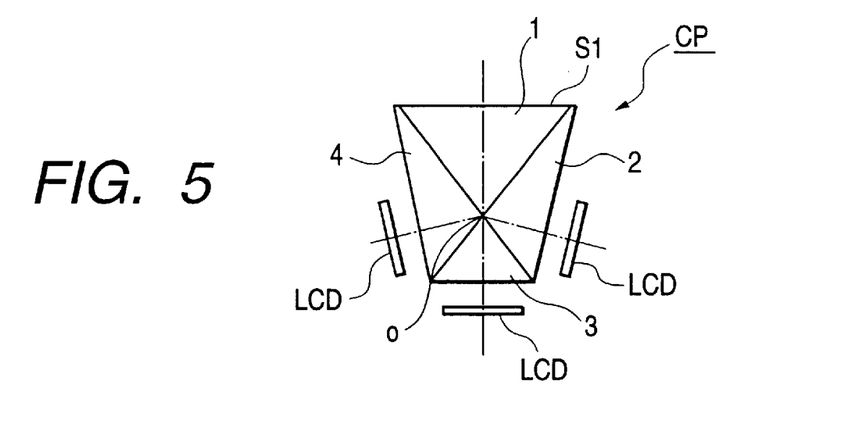
FIG. 5 is a cross-sectional view of the essential portions of Embodiment 2 of the cross dichroic prism of the present invention.
Figure 6:
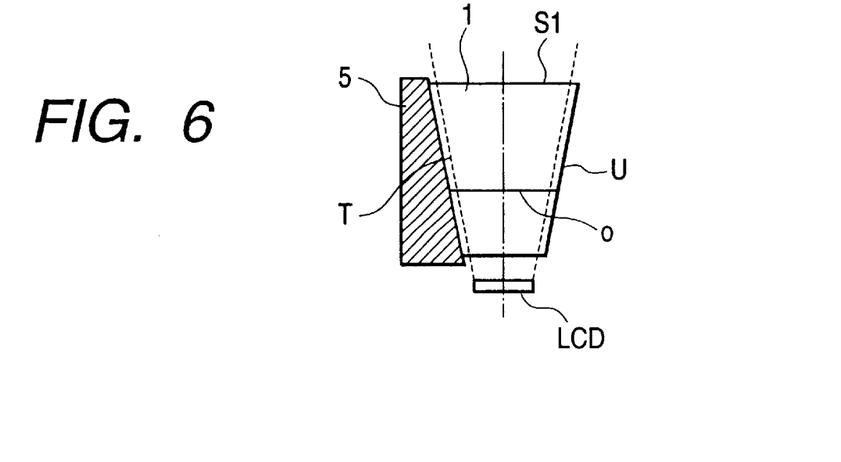
FIG. 6 is a cross-sectional view of the essential portions of Embodiment 2 of the cross dichroic prism of the present invention.

FIGS. 5 and 6 are cross-sectional views of the essential portions of Embodiment 2 of the cross dichroic prism of the present invention. In this embodiment, the setting of the dichroic surface and the shape of a cross-section orthogonal to the ridge line portion are the same as those in Embodiment 1.

The present embodiment achieves the lighter weight of the cross prism as compared with Embodiment 1. In a cross-section containing a ridge line portion 0 shown in FIG. 6 and orthogonal to the light emergence surface S1 of a first prism 1, the end surfaces U and T of the prism are obliquely cut in conformity with the range of a light diverging from a liquid crystal panel LCD to thereby make the shape more compact.

In this case, the holding portion of a holding stand 5 holding the cross prism CP is provided inclinedly with respect to the emergence surface S1 of the first prism 1 so that the cross prism CP may be slid and fixed relative to the inclination.

Figure 7:
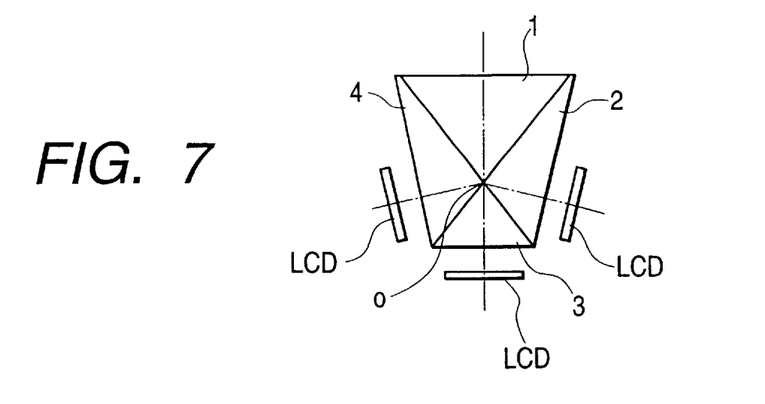
FIG. 7 is a cross-sectional view of the essential portions of Embodiment 3 of the cross dichroic prism of the present invention.
Figure 8:
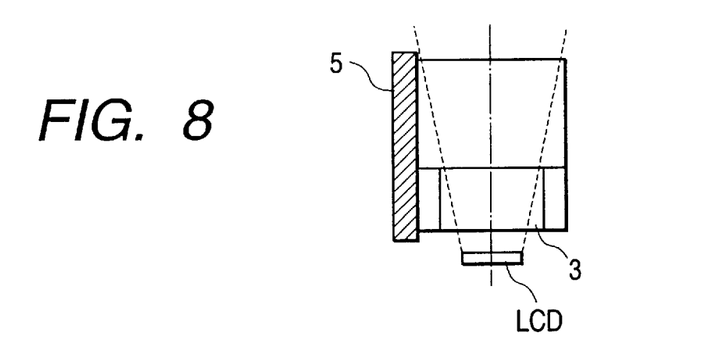
FIG. 8 is a cross-sectional view of the essential portions of Embodiment 3 of the cross dichroic prism of the present invention.
Figure 9:
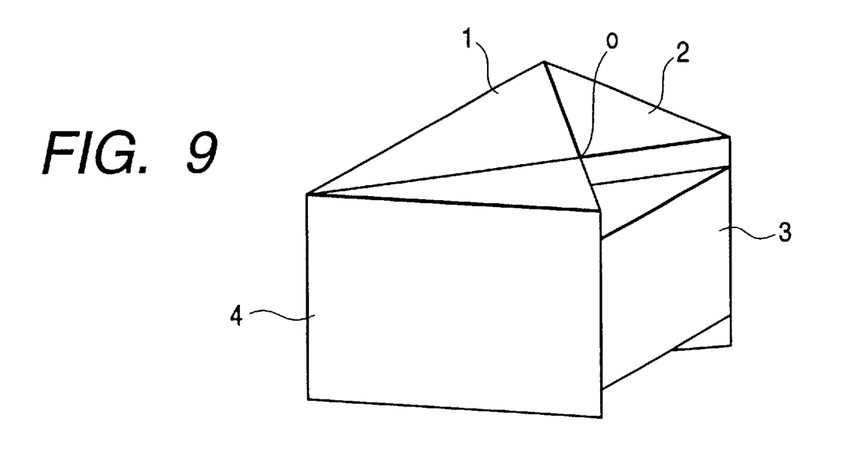
FIG. 9 is a perspective view of the essential portions of Embodiment 3 of the cross dichroic prism of the present invention.

FIGS. 7 and 8 are cross-sectional views of the essential portions of Embodiment 3 of the cross dichroic prism of the present invention, and FIG. 9 is a perspective view of the essential portions of Embodiment 3. Again this embodiment, like Embodiment 2, achieves the lighter weight of the cross prism CP.

The present embodiment is easy to work. In the present embodiment, as shown in FIG. 9, the height of a third prism 3 in the direction of a ridge line portion 0 is made lower than the heights of the other three prisms 1, 2 and 4.

Figure 10:
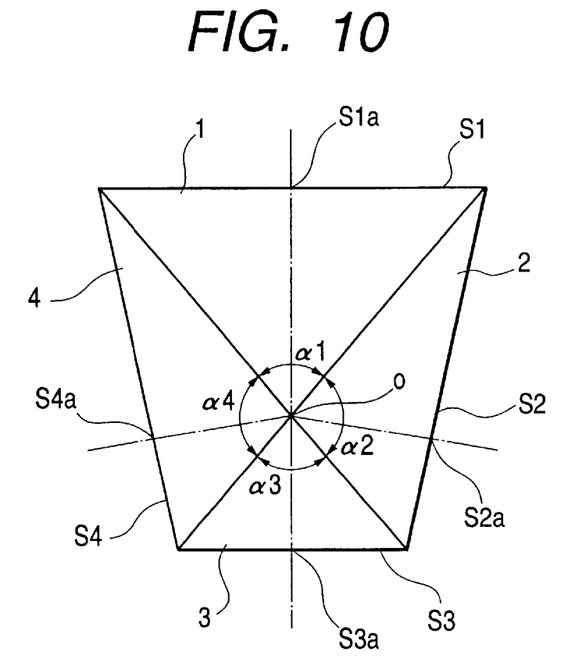
FIG. 10 is a cross-sectional view of the essential portions of Embodiment 4 of the cross dichroic prism of the present invention.

FIG. 10 is a schematic view of the essential portions of Embodiment 4 of the cross dichroic prism of the present invention.

In this embodiment, a first prism 1 and a third prism 3 are isosceles triangle pole prisms of which the lengths of the two sides are equal to each other, and both of them are similar figures.

A second prism 2 and a fourth prism 4 are triangle pole prisms of which the lengths of the sides differ from one another, and both of them are of the same shape.

When the lengths of perpendiculars from a point on the prism ridge line 0 to the non-joined surfaces S1–S4 of the respective prisms are defined as $0, S1a, 0, S2a, 0, S3a$ and $0, S4a$, respectively, $$0, S1a>0, S2a=0, S3a=0, S4a.$$

The angles $\alpha1, \alpha2, \alpha3$ and $\alpha4$ formed against the prism ridge lines 0 of the four prisms 1, 2, 3 and 4 are as follows:

$$\alpha1=\alpha3<90°$$

$$\alpha2=\alpha4>90°$$

$$\alpha1+\alpha2=\alpha3+\alpha4=180°$$

$$(\alpha1+\alpha2+\alpha3+\alpha4=360°)$$

The non-joined surface S1 and the non-joined surface S3 are parallel with each other, and the non-joined surfaces S2 and S4 are not parallel with each other. The area S1$b$ of the non-joined surface S1 and the area S3$b$ of the non-joined surface S3 differ from each other.

The area S2$b$ of the non-joined surface S2 is equal to the area S4$b$ of the non-joined surface S4.

In the present embodiment, S3$b$<S1$b$.

Figure 11:
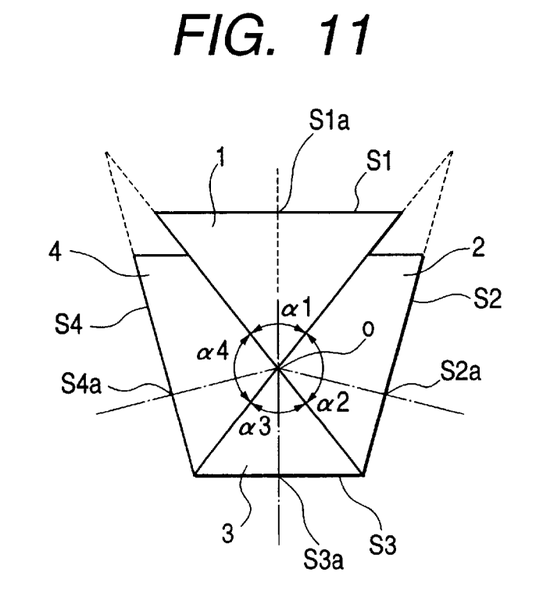
FIG. 11 is a cross-sectional view of the essential portions of Embodiment 5 of the cross dichroic prism of the present invention.

FIG. 11 is a schematic view of the essential portions of Embodiment 5 of the cross dichroic prism of the present invention.

In this embodiment, a first prism 1 and a third prism 3 are isosceles triangle pole prisms of which the lengths of the two sides are equal to each other, and both of them differ in size from each other, but are similar figures.

A second prism 2 and a fourth prism 4 are square pole prisms, and both of them are of the same shape.

When the lengths of perpendiculars from a point on the prism ridge line 0 to the non-joined surfaces S1–S4 of the respective prisms are defined as $0, S1a, 0, S2a, 0, S3a$ and $0, S4a$, respectively, $$0, S1a>0, S2a=0, S3a=0, S4a.$$

The angles $\alpha1, \alpha2, \alpha3$ and $\alpha4$ formed against the prism ridge lines o of the four prisms 1, 2, 3 and 4 are as follows:

$$\alpha1=\alpha3<90°$$

$$\alpha2=\alpha4>90°$$

$$\alpha1+\alpha2=\alpha3+\alpha4=180°$$

$$(\alpha1+\alpha2+\alpha3+\alpha4=360°)$$

The non-joined surface S1 and the non-joined surface S3 are parallel with each other, and the non-joined surface S2 and the non-joined surface S4 are not parallel with each other. The area S1$b$ of the non-joined surface S1 and the area S3$b$ of the non-joined surface S3 differ from each other.

The area S2$b$ of the non-joined surface S2 is equal to the area S4$b$ of the non-joined surface S4.

In the present embodiment, S3$b$<S1$b$.

Figure 12:
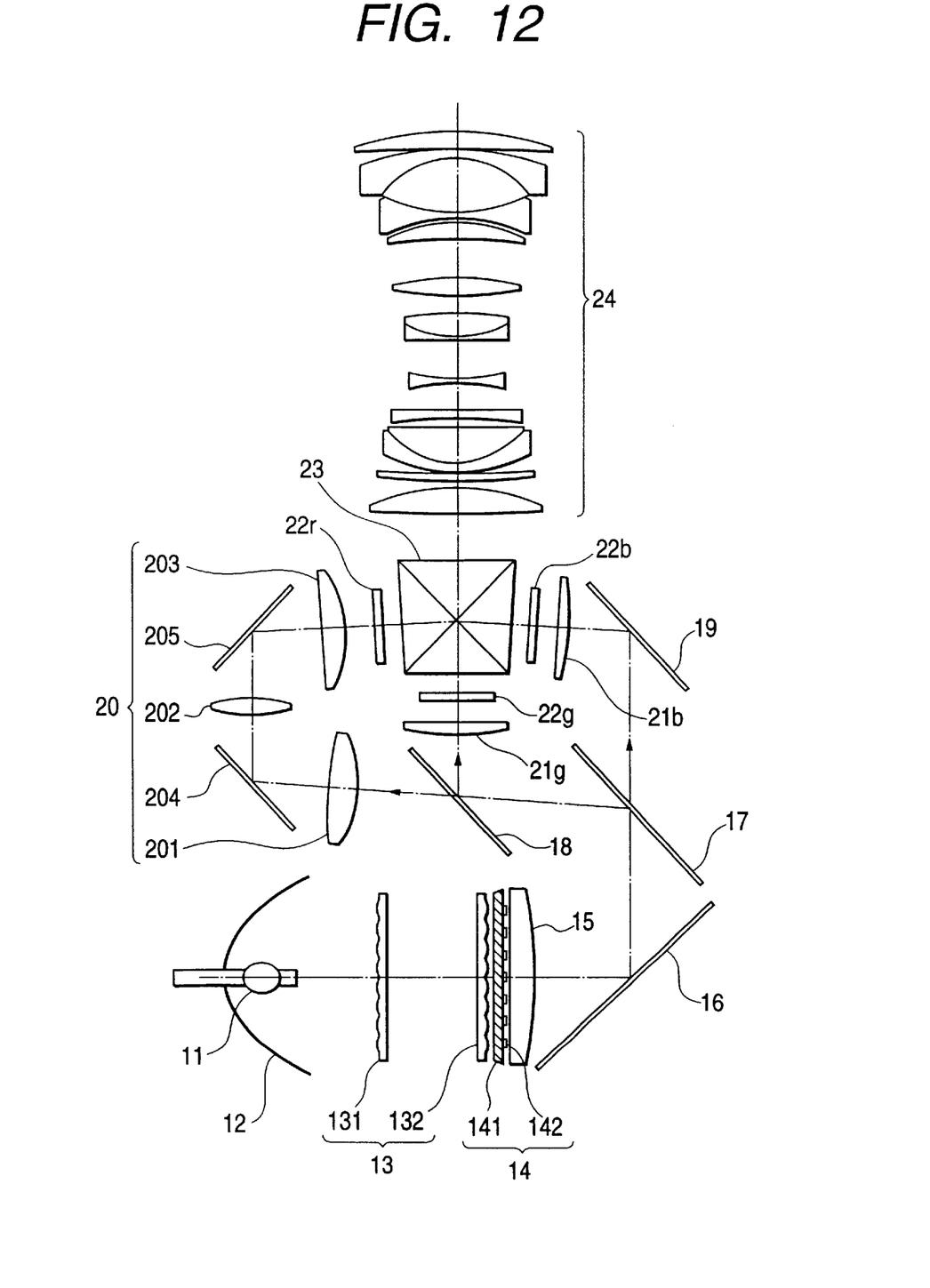
FIG. 12 is a schematic view of the essential portions of an embodiment of the projection apparatus of the present invention.

FIG. 12 is a schematic view of the essential portions of an embodiment of a liquid crystal projector (projection apparatus) using the cross dichroic prism of the present invention.

In this embodiment, the cross dichroic prism 23 is used for color combination, but may also be used for color separating.

In FIG. 12, the reference numeral 11 designates a white light source and the reference numeral 12 denotes a reflector. The reference numeral 13 designates an integrator portion comprising two fly-eye lenses 131 and 132 in which a plurality of lenses are constructed on an array The reference numeral 14 denotes a polarization converting portion comprising a combination of a minute polarizing beam splitter 141 and a phase plate 142 and uniformizing non-polarized light in a predetermined direction of polarization. The reference numeral 15 designated a condensing lens and the reference numeral 16 denotes a reflecting mirror. The reference numeral 17 designates a dichroic mirror for separating, for example, white light into blue (B) light, red (R) light and green (G) light and the reference numeral 18 denotes a dichroic mirror for separating, for example, the red light and the green light from each other. The reference numeral 19 designates a mirror for reflecting the blue light, and the reference numeral 20 denotes a relay illuminating portion for relaying the red light separated by the dichroic mirrors 17 and 18 by lenses 201, 202, 203 and mirrors 204, 205, and forming an illuminating area equivalent to the blue light and the green light at a predetermined position.

The reference characters 21*b* and 21*g* designate condenser lenses for blue and green illuminating lights to a projection lens 24, and the reference characters 22*r*, 22*g* and 22*b* denote liquid crystal panels with microlenses for forming red, green and blue image lights, and a polarizing plate, a phase plate, etc., not shown, are provided forwardly and rearwardly of the main body of each liquid crystal panel.

The reference numeral 23 designates the cross dichroic prism of the present invention used for color combination. The reference numeral 24 denotes a projection lens. As can be seen from this figure, the cross dichroic prism 23 of the present invention is provided as a prism for color combination, whereby the liquid crystal panels 22r and 22b can be constructed in proximity to the liquid crystal panel 22g, and this also contributes to the downsizing of the entire apparatus.

In FIG. 12, unpolarized white light emitted from the light source 11 is forwardly reflected by the reflector 12, and becomes linearly polarized light through the fly-eye lens 131, the fly-eye lens 132 and the polarization converting element 14, and enters the first dichroic mirror 17 through the intermediary of the condensing lens 15 and the total reflection mirror 16.

The white linearly polarized light is resolved, for example, into two colors (here, blue and (green+red) lights), and the blue light is transmitted through the mirror 17 and is reflected by a total reflection mirror 19 and enters the condenser lens 21b, and illuminates the liquid crystal panel 22b for a blue image.

The other (green+red) color light (G, R) is reflected by the first dichroic mirror 17 and enters the second dichroic mirror 18, and is further resolved into two colors, i.e., green and red, by this second dichroic mirror 18, and the green light (G) is reflected by the mirror 18 and enters the condenser lens 21g, and illuminates the liquid crystal panel 22g for a green image.

The red light (R) is transmitted through the mirror 18 and illuminates the liquid crystal panel 22r for a red image through the relay illuminating system 20. The lights having entered the liquid crystal panels 22b, 22g and 22r are light-modulated by the liquid crystal panels corresponding to the respective colors and become lights having the image information of the respective colors, and emerge from the liquid crystal panels 22b, 22g and 22r.

Those image lights of the respective colors having emerged from the liquid crystal panels 22b, 22g and 22r are combined into a light by the cross prism 23 of the present invention for color combination, and the light is projected onto a screen (a predetermined surface) by the projection lens 24.

The cross dichroic prism of the present invention can also be applied to the optical system of a three-plate CCD camera having a color separating system.

What is claimed is:

1. A cross dichroic prism in which four square pillar prisms are mutually joined, satisfying the following condition, $$L1 \ne L2 = L3 = L4$$

where L1, L2, L3, and L4 are lengths of lines which extend perpendicularly to non-joined surfaces of the four square pillar prisms from a point of intersection of dichroic films, respectively, wherein said dichroic prism is constructed such that three color lights to be combined by the dichroic films are adapted to be incident on the non-joined surfaces of said square pillar prisms respectively having the length L2, L3 and L4, and/or three color lights from the dichroic films are adapted to emerge from the non-joined surfaces of said square pillar prisms respectively having the lengths L2, L3 and L4.

2. A cross dichroic prism according to claim 1, characterized in that, in a set of square pillar prisms of two oppposedly disposed square pillar prisms of said four square pillar prisms, the non-joined surface of each of the two oppposedly disposed prisms is equal in area to the other and the other two of said square pillar prisms each have a non-joined surface that differs in area from the other.

3. A cross dichroic prism according to claim 1, characterized in that two of said four square pillar prisms are isosceles square pillar prisms of which the two sides are equal and the other two are square pillar prisms of which the sides differ in length from one another.

4. An optical system characterized by having a cross dichroic prism according to any one of claims 1 to 3.

5. A projection apparatus characterized in that by the utilization of a cross dichroic prism according to any one of claims 1 to 3, a plurality of image lights differing in color from one another are projected by a projection optical system.

6. A cross dichroic prism according to claim 1, characterized in that one of a set of light transmitting surfaces opposed to each other is smaller than the other.

7. A cross dichroic prism according to claim 6, wherein light transmitting surfaces opposed to each other in another set have the same size.

8. A light combining optical system having a cross dichroic prism according to claim 6, characterized in that three divergent lights to be combined are caused to enter the prism from the one small light transmitting surface and light passing surfaces on the opposite sides of the light transmitting surface.

9. A light separating optical system having a cross dichroic prism according to claim 6, characterized in that a convergent light to be separated is caused to enter the prism from the other, larger light transmitting surface.

10. A cross prism in which four square pillar prisms are mutually joined, satisfying the following condition, $$L1 \ne L2 = L3 = L4$$

where L1, L2, L3, and L4 are lengths of lines which extend perpendicularly to non-joined surfaces of the four square pillar prisms from a point of intersection of dichroic films, respectively, wherein said cross prism is constructed such that three color lights to be combined by the dichroic films are adapted to be incident on the non-joined surfaces of said square pillar prisms respectively having the length L2, L3 and L4, and/or three color lights from the dichroic films are adapted to emerge from the non-joined surfaces of said square pillar prisms respectively having the lengths L2, L3 and L4, and wherein said cross prism is characterized in that one of a set of light transmitting surfaces opposed to each other is smaller than the other.

11. A cross prism according to claim 10, wherein light transmitting surfaces opposed to each other in another set have the same size.

12. A cross prism according to claim 10, characterized in that half-transmitting films crossing each other are supplied to the interior of said prism.

13. A cross prism according to claim 10, characterized in that dichroic films crossing each other are supplied to the interior of said prism.

14. A light combining optical system having a cross prism according to any one of claims 11 to 13, characterized in that three divergent lights to be combined are caused to enter the prism from the one small light transmitting surface and light passing surfaces on the opposite sides of the light transmitting surface.

15. A light separating optical system having a cross prism according to any one of claims 11 to 13, characterized in that a convergent light to be separated is caused to enter the prism from the other, larger light transmitting surface.

16. A projection apparatus characterized in that by the utilization of a prism according to any one of claims 7, or 10–13, a plurality of image lights differing in color from one another are projected by a projection optical system.

* * * * *

UNITED STATES PATENT AND TRADEMARK OFFICE
CERTIFICATE OF CORRECTION

PATENT NO. : 6,327,092 B1
DATED : December 4, 2001
INVENTOR(S) : Atsushi Okuyama It is certified that error appears in the above-identified patent and that said Letters Patent is hereby corrected as shown below:

Column 2,
Line 1, "optical." should read -- optical --.

Column 4,
Line 30, "O, S1a, O, S2a, O, S3a and O," should read -- 0, S1a, 0, S2a, 0, S3a and 0, --;
Line 32, "O, S1a>O, S2a=O, S3a=O," should read -- 0, S1a>0, S2a=0, S3a=0, --; and
Line 39, "$\alpha 2=\alpha 4<90°$" should read -- $\alpha 2=\alpha 4>90°$ --.

Column 8,
Line 10, "lines o" should read -- lines 0 --.

Column 10,
Line 63, "claim 7," should read -- claims 6, 7, --.

Signed and Sealed this

Tenth Day of September, 2002

*Attest:*

JAMES E. ROGAN
*Director of the United States Patent and Trademark Office*

*Attesting Officer*